(12) United States Patent
Armour

(10) Patent No.: US 10,933,280 B2
(45) Date of Patent: *Mar. 2, 2021

(54) FITNESS BASED CONTROL OF COMMUNICATIONS DEVICE

(71) Applicant: ATA IT Services LLC, New Palestine, IN (US)

(72) Inventor: Andrew Armour, New Palestine, IN (US)

(73) Assignee: ATA IT Services, LLC, New Palestine, IN (US)

(*) Notice: Subject to any disclaimer, the term of this patent is extended or adjusted under 35 U.S.C. 154(b) by 153 days.

This patent is subject to a terminal disclaimer.

(21) Appl. No.: 15/854,074

(22) Filed: Dec. 26, 2017

(65) Prior Publication Data

US 2018/0117416 A1 May 3, 2018

Related U.S. Application Data

(63) Continuation of application No. 15/697,793, filed on Sep. 7, 2017.

(60) Provisional application No. 62/384,386, filed on Sep. 7, 2016.

(51) Int. Cl.
*H04L 29/06* (2006.01)
*A63B 24/00* (2006.01)
*A63B 71/06* (2006.01)
*H04L 29/08* (2006.01)

(52) U.S. Cl.
CPC ...... *A63B 24/0062* (2013.01); *A63B 71/0619* (2013.01); *A63B 2024/0068* (2013.01); *A63B 2220/17* (2013.01); *A63B 2220/20* (2013.01); *A63B 2220/62* (2013.01); *A63B 2230/06* (2013.01); *A63B 2230/75* (2013.01); *H04L 65/1063* (2013.01); *H04L 67/306* (2013.01)

(58) Field of Classification Search
CPC ............... H04L 67/306; H04L 65/1063; A63B 24/0062; A63B 71/0619; A63B 2024/0068; A63B 2230/75; A63B 2220/20; A63B 2220/62; A63B 2220/17; A63B 2230/06

See application file for complete search history.

(56) References Cited

U.S. PATENT DOCUMENTS

| 9,043,462 B2 * | 5/2015 | Badiee | H04L 43/08 709/224 |
| 9,489,531 B2 * | 11/2016 | Weiss | H04M 1/72577 |
| 2005/0240959 A1 * | 10/2005 | Kuhn | H04N 7/163 725/25 |

(Continued)

OTHER PUBLICATIONS

Bruggen et al., "Modifying smartphone user locking behavior", Proceedings of the Ninth Symposium on Usable Privacy and Security, Article No. 10 pp. 1-14, Jul. 2013.*

*Primary Examiner* — Morshed Mehedi
(74) *Attorney, Agent, or Firm* — Overhauser Law Offices, LLC

(57) ABSTRACT

This disclosure describes systems, methods, and apparatus for monitoring motion or other activity and using the successful completion of a goal to enable or disable functionality or features of an electronic device or applications running on a computing system. In particular, media devices and the features within can be disabled unless access availability has been determined for completion of a physical activity goal or other challenge and provided to the media device or a server controlling features of the media device.

17 Claims, 4 Drawing Sheets

(56) References Cited

U.S. PATENT DOCUMENTS

| | | | |
|---|---|---|---|
| 2011/0138409 A1* | 6/2011 | Svensson | H04L 63/10 |
| | | | 725/25 |
| 2011/0202269 A1* | 8/2011 | Reventlow | G06F 21/316 |
| | | | 701/533 |
| 2012/0239173 A1* | 9/2012 | Laikari | A61B 5/1112 |
| | | | 700/91 |
| 2013/0132854 A1* | 5/2013 | Raleigh | G06F 3/0482 |
| | | | 715/738 |
| 2014/0122863 A1* | 5/2014 | Prager | G06F 21/316 |
| | | | 713/100 |
| 2014/0289864 A1* | 9/2014 | Dimitrakos | G06F 21/572 |
| | | | 726/26 |
| 2015/0180894 A1* | 6/2015 | Sadovsky | H04L 67/22 |
| | | | 726/22 |
| 2015/0350217 A1* | 12/2015 | Thorson | H04L 63/102 |
| | | | 726/4 |
| 2016/0080793 A1* | 3/2016 | Ruffini | H04N 21/2668 |
| | | | 725/34 |
| 2016/0366147 A1* | 12/2016 | Nguyen | H04N 21/4532 |

* cited by examiner

FITNESS BASED CONTROL OF COMMUNICATIONS DEVICE

CROSS-REFERENCE TO RELATED APPLICATIONS

This US non-provisional patent application is a continuation of and claims the benefit of and priority to U.S. non-provisional patent application Ser. No. 15/697,793 filed 7 Sep. 2017 which claims the benefit of and priority to U.S. provisional patent application Ser. No. 62/384,386 filed 7 Sep. 2016, both entitled "Fitness Based Control of Communications Device," the entire contents of which are specifically incorporated herein by reference.

TECHNICAL FIELD

The invention generally relates to tracking physical activity, and in particular to managing an entertainment device access and features based on physical activities.

BACKGROUND

Many individuals are overweight or obese. Individuals can be employees, family members, dependents and friends. In particular, parents try to encourage exercise or physical activity in children. As computer-based technology with, for example, entertainment and social media pervade ever more aspects of individuals and especially children's' lives, exercise often takes second chair to these less healthy forms of entertainment. Some parents have tried to prevent overuse of television and gaming by creating parental locks on televisions. For instance, U.S. Pat. No. 5,231,310 discloses a parental television lock, and U.S. Pat. No. 5,060,079 discloses a parental television lock where children can unlock the television for periods of time selected by a parent via use of a programmed card that tracks the child's television usage and remaining time allotment. Others have realized that exercise and television need not be separate and competing interests. U.S. Pat. No. 6,376,936 discloses a wireless on and off switch for a television where the switch is controlled by a threshold of peddling speed on a stationary bike.

SUMMARY

Exemplary embodiments of the present invention are shown in the drawings or summarized below. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one particular aspect of the present application, a system allows a parent to limit their child's time spent on a communication or technology devices, such as a cellphone, smartphone, tablet, laptop, set top box or computer (a "child device"). This technology allows for the parent or device owner to set activity thresholds that limit the child's or end user's time spent on that device. A range of technology used by the device owner can be synchronized to manage screentime from a parent access mode. (The term screentime is referring to the amount of time allowed/spent using a technology driven device). This means that if an end user spends their free time using any of the items listed above, then each technology driven device can be managed through the mobile application technology downloaded to the technology devices.

In addition to parents, the system is equally usable by guardians or other persons. For example, a person may use the system to control a communications device of an elderly parent in a nursing home when it is desired that the parent remains physically active. In this context, the term "child" or "child device" can refer to the person or device that is controlled by another person, which is referred to herein as the "parent" or "parent device."

In another aspect of the present application, screentime may be earned by a participant through activity levels which can be tracked by various methods such as, for example, wearable technology. The more active the participant, the more access that individual accumulates. The activity information derived from the participant's wearable activity tracker provides data that can then be compared to previously configured thresholds. These thresholds can vary dependent on age, weight, height, setting, fitness experience and lifestyle. This technology allows for a participant to individually pre-select or determine to participate in fitness activities with the established thresholds which, once those thresholds have been met, can then be redeemed for screentime access.

Other embodiments of the disclosure may also be characterized as a system for locking and unlocking functions and features of user devices. The system can include an application and a set of servers with memory and a processor. The application can be for collecting and transmitting user activity data. The memory can be for storing the user activity data that describes a user activity level. The processor of a first server can be configured to convert the user activity data to a value and transmit a request to the second server based on the value. The $2^{nd}$ server can be configured to receive the request to enable a user device, user device feature, user device application, or feature of a user device application. The second server can further be configured to determine if the request can be met with the value and to fulfill the request if there is sufficient value.

Still other embodiments of the disclosure can be characterized as tangible computer readable media embodying a method of locking and unlocking user devices, features, applications, and features of applications. The method can include storing user activity data in a memory, where the user activity data describes a level of user activity. The method can also include accessing the user activity data in the memory via a processor. The method can further include converting the user activity data to a value via the processor. The method additionally can include storing the value in the memory. Furthermore, the method can include receiving a request to enable a user device, user device feature, user device application, or feature of a user device application. The method can also include determining if the request can be met with the value in the memory, via the processor. Finally, the method can include fulfilling the request if there is sufficient value.

Figure 1A:
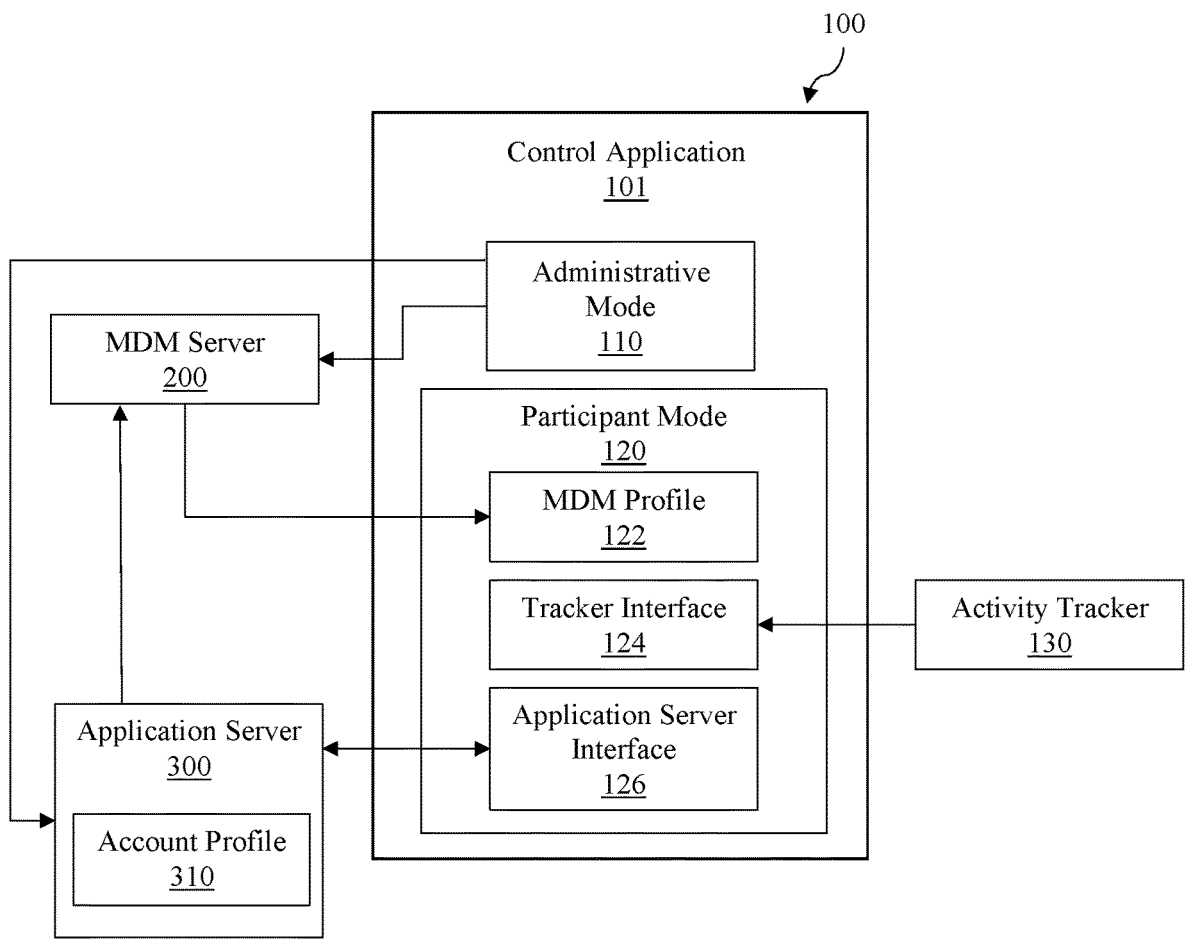
FIGS. 1a and 1b are schematic diagrams of a system of one aspect of the present application.

DETAILED DESCRIPTION OF THE
ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1B:
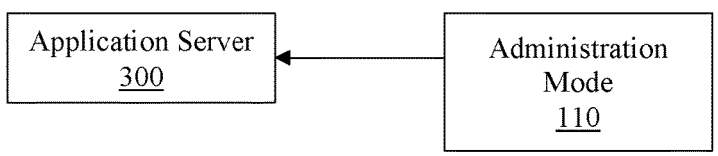

A device management system 100 that controls access to functions of a device based on fitness or activity levels of the present application is shown in FIG. 1a. The system 100 includes a control application 101 which is installed on a device to be controlled. The control application 101 includes an administrative mode 110. The administrative mode 110 facilitates the installation of an MDM profile 122 on the device, creates and modifies a participant account 310 on an application server 300 including the establishment of activity threshold values and limited access functions for the device, and monitors a status of the participant account 310. Shown in FIG. 1b, the control application 101 can include the administrative mode 110 on a device other than the one being controlled with the same operations, access to information and interaction with the application server 300.

The control application 100 further includes a participant mode 120. The participant mode 120 tracks activity data for a participant with a tracker interface 124. The participant mode 120 sends activity data and requests access to the limited access functions on the device from the application server 300 through an application server interface 126. Activity of a participant can be tracked with an activity tracker 130 which is integral to the participant device, a wearable activity tracker linked to the participation device, and the like. The activity data can include data such as steps, heart rate, calories, distance, flights of stairs, consecutive minutes at heart rate, consecutive minutes of activity, and the like.

The application server 300 maintains a participant account 310 which can include threshold values, activity data and a list of limited access functions for a device; determines access availability to the limited access functions based on the threshold values and the activity data; and sends instructions to enable and disable the limited access functions through the MDM server 200. The application server 300 may further be capable of monitoring device function access availability based on an access time frame established from the time enabling instructions are sent to the MDM server 200 and a request to disable access to the limited access functions is received.

The mobile device manager (MDM) server 200 provides an MDM profile 122 for installation on the device and modifies the MDM profile 122 based on instructions from the application server 300. The MDM profile 122 controls access to the limited access functions. MDM is an industry term for the administration and management of mobile devices, such as smartphones, tablets and laptops. The intent of MDM is to optimize the functionality and security of mobile devices within an enterprise, while simultaneously protecting the corporate network. To accomplish this, MDM allows an enterprise to limit to prevent access to specified functions or programs that may be available for the mobile device.

One aspect of the invention of this application is a method for providing access management of a device based on tacked levels of activity. The method utilizes an application server and an MDM server. Each server running software. The method also utilizes a mobile control application which is run from the device on which access is to be managed.

After recognizing a participant device with the mobile control application, steps are taken to install an MDM profile on the participant device and create a participant account with the application server. These steps can be accessed when the mobile control application is in an administrative mode. The administrative mode would be accessible to an individual with the authority to manage access to functions of a device. The individual with authority can, for example, be an employer or a parent.

In a further aspect of the application, the administrative mode can be operated from a device other than the participant device. The mobile control application is installed on the admin device to provide the administrative mode. From whichever device an administrator utilizes the mobile control application, the administrator would be able to access associated participant account information and make modifications. In another aspect, the administrative mode may also provide status and activity data about a particular participant. The administrator may be capable of managing the accounts and control of multiple participant devices.

Figure 3:
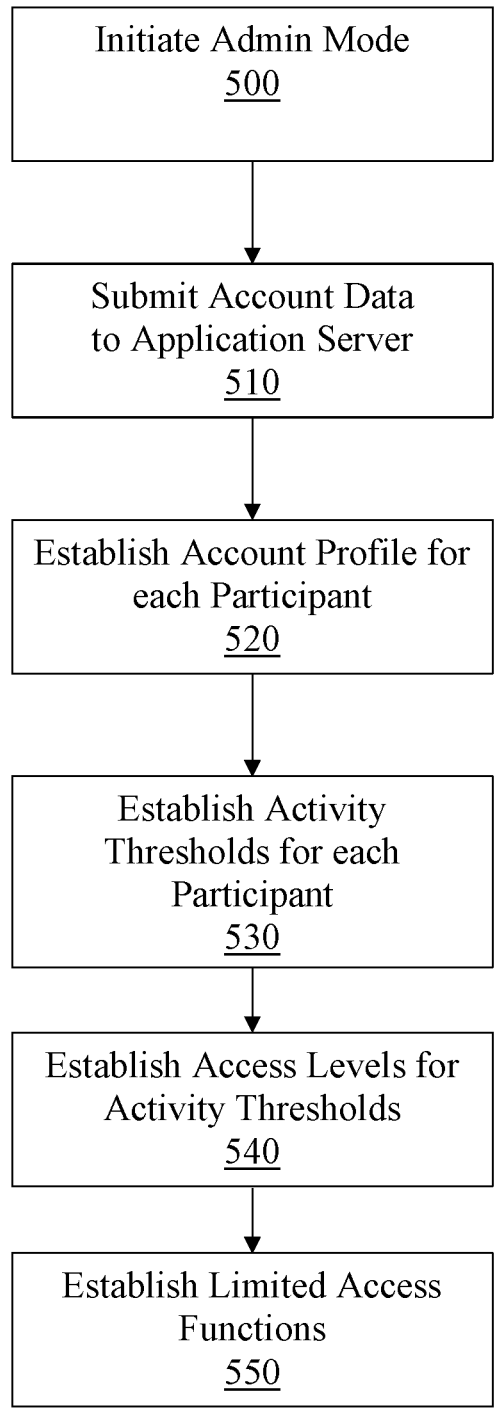
FIG. 3 is another flow diagram showing one aspect of the present application including set up of a device control management system.

As shown in FIG. 3, while in the administrative mode 500, steps are taken to create an account profile by submitting account information 510 that can include, for example, participant information (name, age, height, weight, etc.) 520, thresholds for earning access 530, how much access is earned 540, which functions to limit access to 550, and the like. In another aspect, the administrator can select predetermined account information such as, but not limited to, activity threshold levels established for a child based on characteristics of the child including age, height, weight, gender and the like. In another example, the account profile can designate activity threshold levels that vary according to a day of the week.

Threshold examples can include (a) 3,000 steps taken=15 minutes of earned access time where for each time the participant logs 3,000 steps, the participant earns 15 minutes of access time, (2) 100 calories burned=15 minutes of earned access time where for each time the participant burns 100 calories, the participant earns 15 minutes of access time, (3) heart rate hits 100=5 minutes of access time where for each time the participant's heart rate goes above 100, the participant earns 5 minutes of access time, and the like.

Figure 2:
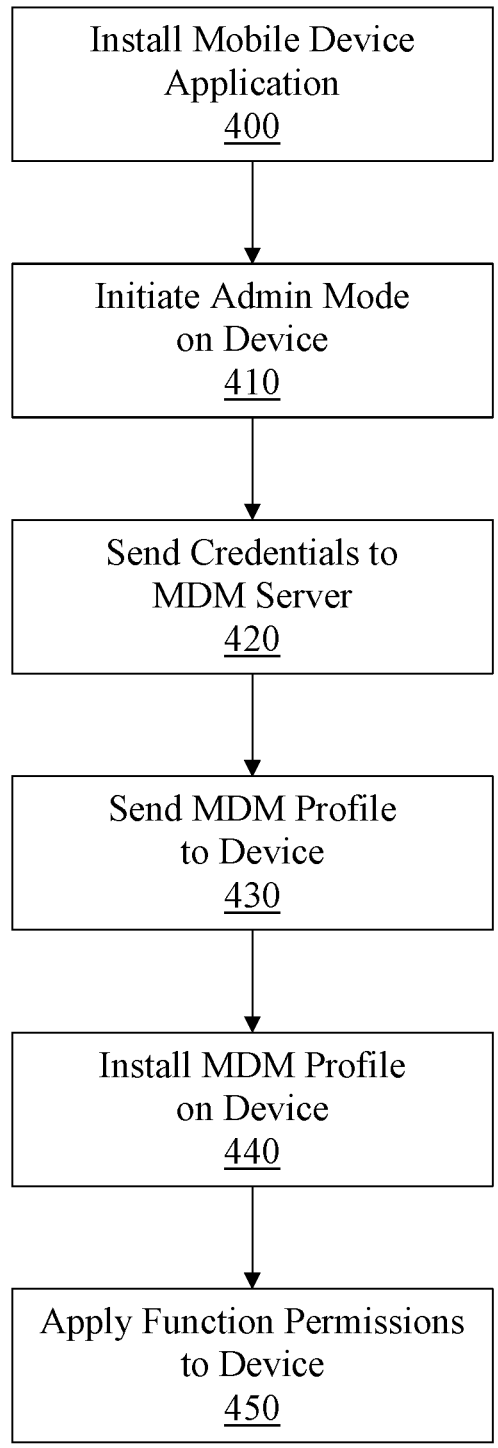
FIG. 2 is a flow diagram showing one aspect of the present application including set up of a device control management system.

As shown in FIG. 2, once a mobile device application is installed 400 while in the administrative mode 410, an MDM profile is installed. The MDM profile includes a set of function permissions. The function permissions of the MDM profile control access to designated functions on the participant device. To install the MDM profile, the administrator initiates a request from the mobile control application operating on the device to be managed. The application sends the request with a set of credentials to the MDM server 420. The MDM server authorizes the MDM profile installation request with the credentials. The MDM profile is transmitted 430 and installed 440 on the participant device. The installed MDM profile can then implement a set of function permissions on the device 450. By implementing the set of function permissions, the MDM profile controls access to a set of designated functions on the participant device.

Figure 4:
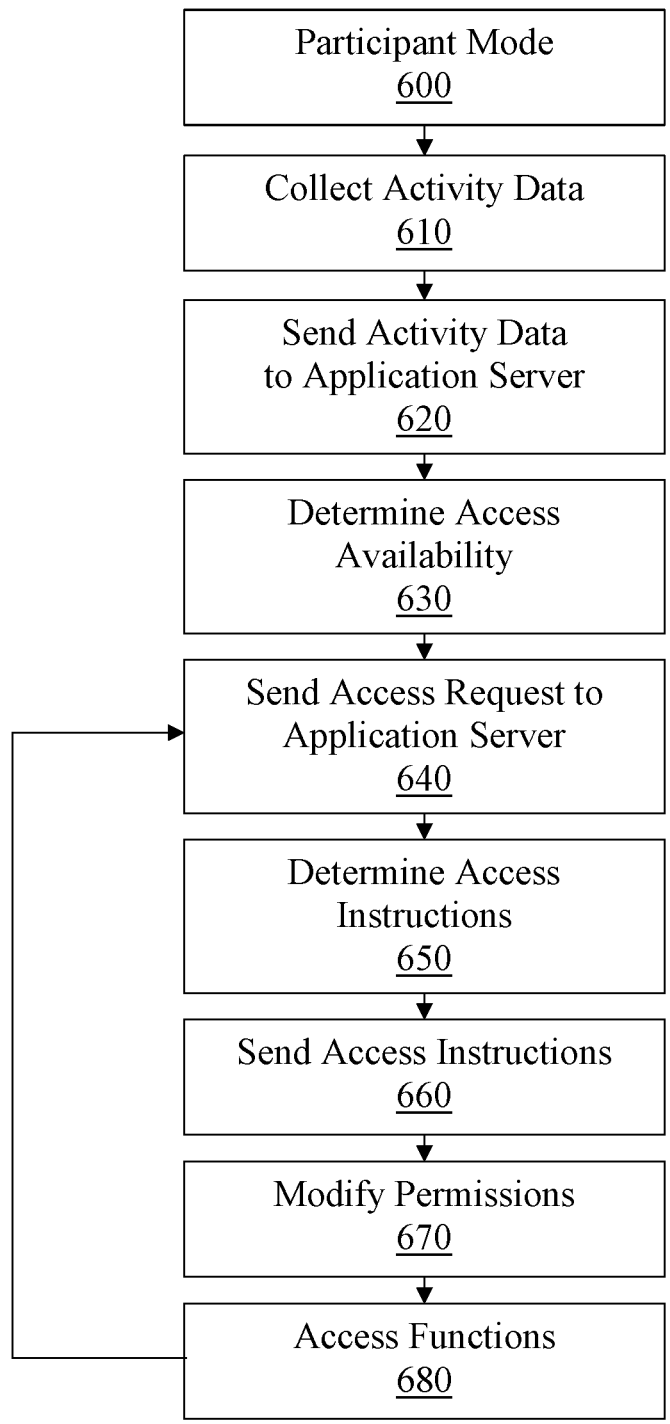
FIG. 4 is a flow diagram showing one aspect of the present application including application of a device control management system.

In one aspect of the present application, the mobile control application can run in a participant mode 600 as shown in FIG. 4. In the participant mode, the participant device receives activity data 610. The activity data can include several types of data such as but not limited to steps, heart rate, calories, distance, flights of stairs, consecutive minutes at heart rate, and consecutive minutes of activity. The activity can be tracked with hardware that is integral with the participant device or from a separate device. The separate device would be linked to the participant device to allow the activity data to be transferred between the two devices. The mobile control application can then utilize the transferred data. The separate device can be a wearable device.

The activity data is transferred from the mobile control application on the participant device to the application server 620. The software on the application server uses the activity data along with the account profile to create an access record 630. The access record will include the access time the participant has earned with the activity data.

The participant can transmit an access request from the mobile control application on the participant device to the application server 640. The application server determines whether the access should be granted based on the access record created with the activity data and the account profile 650. A set of instructions are generated in response to the whether the access record includes access time and sent to the MDM server 660. The MDM server sends an updated MDM profile to the participant device to modify the function permissions 670. Modifying the function permissions can grant access to the limited access functions on the device 680. The request for access process can be repeated.

In one example, the application server software determines to grant the participant access based on an access record including access time earned for activity. An enabling instruction is transmitted from the application server to the MDM server. The MDM server then transmits an update to the MDM profile on the participant device. The updated MDM profile includes function permissions that allow access to the designated functions on the participant device.

In a further aspect, the application server determines how long the participant will have access to the designated functions. The applications server tracks the time from when instructions for enabling access are sent and compares that time with the access time of the access record. When the allowed time reaches the time available in the access record a disabling instruction is transmitted to the MDM server. The MDM server then transmits another updated to the MDM profile on the device. This update includes function permissions that prevent access to the designated functions on the device.

In an alternative aspect, the participant can transmit a stop request to the application server. The application server sends disabling instruction to the MDM server to prevent access to the designated functions. The application server, tracking the usage access time, can then update the access record with a reduced amount of available time for the access record.

In one specific example, a parent downloads the Mobile Application from an online storage facility (e.g., Apple store) to their Child's device. Once the Mobile Application is downloaded, the Parent has the ability to link one or a plurality of Child devices to the Parent's account through the App. The Parent accesses the Child's account settings using an administrative mode on the Parent's device or the Child's device to set up the fitness/activity thresholds. This allows the Parent to set fitness/activity thresholds for each Child to meet or exceed before access to selected Apps is provided on the Child's device. Parents could have the option to grant or deny access to the Child's phone or device at any time regardless of earned activity time with an override functionality. Parents can also set a time frame in which each Child can and cannot earn/use screentime. For example, access is allowed only between 7 am-9 pm. The corollary being access would be denied from 9:01 pm-6:59 am.

Further in the administrative mode, the Parent would be provided with the home layout of each Child's device (the device home display screen). The Parent would go through the layout and select which Apps or functions will display all the time and which Apps or functions will disappear when the Child is denied screentime. This process allows the Parent to hide all Apps and Games that the Child is commonly using based on activity levels of the Child. This forces the Child to put down the device or phone and be more active. Once the Parent has set up the fitness/activity levels and selected Apps to display/hide, screentime and access to favorite Apps and Games are managed and earned by each Child dependent on the configured thresholds.

Another last step that may be required is the synchronization of the Child's wearable activity tracker. The wearable would be Bluetoothed to that Child's device. Bluetooth allows for the Mobile Application to pull in the fitness/activity information from the Child's wearable activity tracker automatically. Another option would to allow the Application to sync to the wearable tracker creating a connection between the wearable and the app.

The main way for a Child to earn screentime is to meet a Parent configured threshold. If the Child is not active then the Child's device will remain locked until activity thresholds have been met.

In another example, Tony is 11 years old and has run out of screentime at 5 pm on a Thursday night. The child decides to sit and watch TV for 2 hours and then gets a call from a friend. The friend wants to play a mobile app based game with him beginning at 8 pm. Since Tony decided to watch TV instead of getting up and earning more screentime through trackable activity, Tony is paying the consequences of no screentime because he decided to not be active. The only way Tony could play the game with his friend at 8 pm is to work as hard as he can to meet the parent configured fitness/activity threshold. Tony can decide at 7 pm that he is going to be as active as he can before 8 pm. He recognizes that he loses access to everything on his phone at 10 pm each week night (because that was how his parents configured his access) so he needs to be extremely active if he wants to earn at least an hour of screentime to play this game with his friend.

From 7 pm-8 pm Tony does push-ups and sit-ups along with running up and down the stairs in his home. Throughout the hour Tony ended up burning 114 calories and his heart rate hit >100 5 times. With Tony's wearable activity tracker tracking this activity, the information is automatically sync'd to his device. Once the synchronization has occurred from the wearable tracker to the device, the mobile application will transmit the information to the application server where his activity is compared to the Parent configured thresholds. Since Tony's parents configured the settings to grant 30 minutes for reaching 100 calories and 5 minutes every time his heart rate broke 100, Tony ended up earning 55 minutes of screentime. The extra 14 calories that Tony burned can be saved to Tony's activity log so the next time he runs into this issue, Tony starts off with 14 calories that he has already burned instead of starting at 0.

In yet another specific example, Erika is a 21-year-old college student that downloads the mobile application. Erika as her own administrator configures fitness thresholds along with setting up a time each night to limit access for study purposes. Her personalized thresholds add 15 minutes of screentime each 5,000 steps along with 5 minutes each time she burns 100 calories. Erika needs to lose 15 pounds before her sister's wedding so she made it more difficult for herself to earn screentime. Erika loves to use Facebook®, Instagram®, Pinterest® and SnapChat® so these are the main social media applications that she has blocked herself from when her screentime has expired. Erika originally earned 30 minutes for each 5,000 steps and 15 minutes per 100 calories burned. Erika noticed that if she lowered the amount of screentime granted per threshold that she could easily lose much more weight before the wedding. To keep on track with her studies, Erika blocked each week night from 10 pm-11 pm for studying purposes. So even if Erika got side tracked during this study period and turned to her cell phone by habit, the mobile application technology would hide the selected applications from Erika's mobile device application layout view. This forces Erika to stay off her phone and study.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fitness-based access management method comprising the steps of:
   providing access to an application server and an MDM (mobile device manager) server;
   providing a mobile control application;
   recognizing a participant device having the mobile control application;
   recognizing an administrative mode of the mobile control application;
   recognizing a participation mode of the mobile control application on the participant device;
   installing an MDM profile on the participant device, the MDM profile having a set of function permissions for application to the participant device;
   creating an account profile in response to an account data set through the mobile control application;
   receiving an activity data set with the mobile control application on the participant device;
   transmitting the activity data set from the mobile control application on the participant device to the application server;
   creating an access management record in response to the activity data set and the account profile;
   transmitting an access request from the mobile control application on the participant device to the application server;
   determining a permission in response to the access request, the access management record, and the account profile;
   transmitting an instruction from the application server to the MDM server in response to determining the permission;
   transmitting an update from the MDM server to the MDM profile on the participant device in response to the instruction; and
   modifying the set of function permissions for the participant device in response to the update to the MDM profile;
   transmitting an MDM profile installation request having a mobile control application credential to the MDM server from the mobile control application on the participant device while in the administrative mode;
   authorizing the MDM profile installation request with the mobile control application credentials by the MDM server;
   transmitting the MDM profile to the participant device in response to authorizing the MDM profile installation request;
   installing the MDM profile on the participant device; and
   implementing the set of function permissions on the participant device.

2. The fitness-based access management method of claim 1 wherein implementing the set of function permissions further includes controlling access to a set of functions on the participant device.

3. A fitness-based access management method comprising the steps of: providing access to an application server and an MDM (mobile device manager) server;
   providing a mobile control application;
   recognizing a participant device having the mobile control application;
   recognizing an administrative mode of the mobile control application; recognizing a participation mode of the mobile control application on the participant device;
   installing an MDM profile on the participant device, the MDM profile having a set of function permissions for application to the participant device;
   creating an account profile in response to an account data set through the mobile control application;
   receiving an activity data set with the mobile control application on the participant device;
   transmitting the activity data set from the mobile control application on the participant device to the application server;
   creating an access management record in response to the activity data set and the account profile;
   transmitting an access request from the mobile control application on the participant device to the application server;
   determining a permission in response to the access request, the access management record, and the account profile;
   transmitting an instruction from the application server to the MDM server in response to determining the permission;
   transmitting an update from the MDM server to the MDM profile on the participant device in response to the instruction; and modifying the set of function permissions for the participant device in response to the update to the MDM profile;

accepting an account data set with the administrative mode of the mobile control application including: establishing a set of thresholds; establishing a set of access earned values from the account data set; and establishing a set of functions on the participant device where access to the set of functions is to be controlled by the set of function permissions of the MDM profile; transmitting the account data set to the application server from the mobile control application.

4. The fitness-based access management method of claim 3 further including:
transmitting a function control instruction to the MDM server in response to the account data set;
transmitting a set up command from the MDM server to the MDM profile on the participant device in response to the function control instruction; and
modifying the set of function permissions for the participant device in response to the set up command.

5. The fitness-based access management method of claim 3 further including accepting the account data set with the administrative mode of the mobile control application from an admin device wherein the admin device is separate from the participant device.

6. The fitness-based access management method of claim 5 further including creating a second account profile from a second account data set related to a second participant device.

7. The fitness-based access management method of claim 1 wherein receiving the activity data set with the mobile control application further includes receiving activity data from an activity tracker selected from a group consisting of: an activity tracker integral to the participant device, a wearable activity tracker linked to the participation device, and combinations thereof.

8. The fitness-based access management method of claim 1 wherein receiving the activity data set with the mobile control application further includes receiving activity data from a group consisting of: steps, heart rate, calories, distance, flights of stairs, consecutive minutes at heart rate, consecutive minutes of activity, and combinations thereof.

9. A fitness-based access management method comprising the steps of:
providing access to an application server and an MDM (mobile device manager) server;
providing a mobile control application;
recognizing a participant device having the mobile control application;
recognizing an administrative mode of the mobile control application;
recognizing a participation mode of the mobile control application on the participant device;
installing an MDM profile on the participant device, the MDM profile having a set of function permissions for application to the participant device;
creating an account profile in response to an account data set through the mobile control application;
receiving an activity data set with the mobile control application on the participant device;
transmitting the activity data set from the mobile control application on the participant device to the application server;
creating an access management record in response to the activity data set and the account profile;

transmitting an access request from the mobile control application on the participant device to the application server;
determining a permission in response to the access request, the access management record, and the account profile;
transmitting an instruction from the application server to the MDM server in response to determining the permission;
transmitting an update from the MDM server to the MDM profile on the participant device in response to the instruction; and
modifying the set of function permissions for the participant device in response to the update to the MDM profile;
determining an enabling permission when the access management record includes a positive value of availability;
transmitting an enabling instruction from the application server to the MDM server in response to determining the enabling permission;
transmitting an enabling update from the MDM server to the MDM profile on the participant device in response to the enabling instruction;
modifying the set of function permissions for the participant device in response to the enabling update to the MDM profile,
wherein the set of function permissions modified by the enabling update allows access to a set of functions on the participant device where access to the set of functions is established to be controlled by the MDM profile;
determining a disabling permission when the access management record does not include a positive value of availability;
transmitting a disabling instruction from the application server to the MDM server in response to determining the disabling permission;
transmitting a disabling update from the MDM server to the MDM profile on the participant device in response to the disabling instruction; and
modifying the set of function permissions for the participant device in response to the disabling update to the MDM profile,
wherein the set of function permissions modified by the disabling update prevents access to the set of functions on the participant device where access to the set of functions is established to be controlled by the MDM profile.

10. A device access control method comprising the steps of:
providing a system hardware set including an application server and an MDM (mobile device manager) server;
providing a mobile control application;
recognizing a participant device having the mobile control application;
recognizing an administrative mode of the mobile control application;
transmitting an MDM profile installation request with a mobile control application credential to the MDM server while the mobile control application is in the administrative mode;
authorizing the MDM profile installation request with the mobile control application credentials;
transmitting an MDM profile to the participant device in response to authorizing the MDM profile installation request;

installing the MDM profile on the participant device, the MDM profile having a set of function permissions for application to the participant device;

accepting an account data set with the administrative mode of the mobile control application including:
 establishing a set of thresholds,
 establishing a set of access earned values from the account data set, and
 establishing a set of functions on the participant device where access to the set of functions is to be controlled by the set of function permissions of the MDM profile;

transmitting the account data set to the application server from the mobile control application;

creating an account profile in response to the account data set;

recognizing a participation mode of the mobile control application on the participant device;

receiving an activity data set with the mobile control application on the participant device;

transmitting the activity data set from the mobile control application on the participant device to the application server;

analyzing the activity data set received by the application server based on the account profile;

creating an access record in response to analyzing the activity data set;

transmitting an access request from the mobile control application on the participant device to the application server;

determining an instruction in response to the access request and the access record;

transmitting the instruction from the application server to the MDM server;

transmitting an update to the MDM profile on the participant device in response to the instruction;

modifying the set of function permissions of the MDM profile in response to the update to the MDM profile allowing access to a set of controlled functions on the participant device;

determining an access time based on the access request and the access record;

transmitting a disable instruction from the application server to the MDM server after the access time has lapsed;

transmitting a disable update to the MDM profile on the participant device in response to the disable instruction; and modifying the set of function permissions of the MDM profile in response to the disable update to the MDM profile preventing access to the set of controlled functions on the participant device.

11. The device access control method of claim 10 further including:
 transmitting a function control instruction to the MDM server in response to the account data set;
 transmitting a set up command from the MDM server to the MDM profile on the participant device in response to the function control instruction; and
 modifying the set of function permissions for the participant device in response to the set up command.

12. The device access control method of claim 10 wherein accepting the account data set further includes accepting an activity threshold level provided from a pre-existing template for a child based on a child characteristic selected from a group consisting of age, physical characteristics, gender and combinations thereof.

13. The device access control method of claim 12 wherein accepting the activity threshold level varies according to predetermined levels based on a day of the week.

14. A fitness-based device management system consisting of:
 an application server having memory and a processor;
 an MDM (mobile device manager) server; and
 a device control application,
 wherein the application server is configured to:
  maintain a participant account including a set of threshold values, a set of activity data and a set of limited access functions on a device,
  determine access availability to the set of limited access functions based on the set of threshold values and the set of activity data, and
  monitor access availability based on an access time frame;
  send instructions to enable and disable the set of limited access functions through the MDM server,
 wherein the MDM server is configured to:
  provide an MDM profile to the device controlling access to the set of limited access functions,
  modifying the MDM profile based on the instructions from the application server, and
 wherein the device control application is configured to:
  operate in an administrative mode, wherein the administrative mode is configured to:
   request the MDM profile be installed on the device,
   create the participant account including establishment of the set of threshold values, the set of activity data and the set of limited access functions on the device,
   monitor a status of the participant account, and
   modify the participant account including modification of the set of threshold values, the set of activity data and the set of limited access functions on the device, and
  operate in a participant mode, wherein the participant mode is configured to:
   track a set of activity data for a participant,
   send the set of activity data to the application server, and
   request access to the set of limited access functions on the device from the application server.

15. The fitness-based device management system of claim 14 wherein the access time frame is established from sending instructions through the MDM server and receiving of a request to disable access to the set of limited access functions on the device.

16. The fitness-based device management system of claim 14 wherein the device control application is further configured to track the set of activity data from an activity tracker selected from a group consisting of: an activity tracker integral to the participant device, a wearable activity tracker linked to the participation device, and combinations thereof.

17. The fitness-based device management system of claim 14 wherein the set of activity data includes data from a group consisting of: steps, heart rate, calories, distance, flights of stairs, consecutive minutes at heart rate, consecutive minutes of activity, and combinations thereof.

* * * * *

UNITED STATES PATENT AND TRADEMARK OFFICE
CERTIFICATE OF CORRECTION

PATENT NO.          : 10,933,280 B2
APPLICATION NO.     : 15/854074
DATED               : March 2, 2021
INVENTOR(S)         : Andrew Armour Page 1 of 1

It is certified that error appears in the above-identified patent and that said Letters Patent is hereby corrected as shown below:

On the Title Page

Item (60) should read as follows:
Related U.S. Application Data
(60) Provisional application No. 62/384,326, filed on Sep. 7,2016.

In the Specification

In Column 1, Line 11 cancel text "62/384,386" and replace it with "62/384,326"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*